US012663512B2

(12) United States Patent
Haitman et al.

(10) Patent No.: US 12,663,512 B2
(45) Date of Patent: Jun. 23, 2026

(54) SYSTEM AND METHOD FOR DOPPLER ENCODING FOR RADAR OBJECT DETECTION

(71) Applicant: GM GLOBAL TECHNOLOGY OPERATIONS LLC, Detroit, MI (US)

(72) Inventors: Yuval Haitman, Ramat-Gan (IL); Oded Bialer, Petah Tikva (IL)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 18/403,122

(22) Filed: Jan. 3, 2024

(65) Prior Publication Data

US 2025/0216511 A1 Jul. 3, 2025

(51) Int. Cl.
*G01S 7/41* (2006.01)

(52) U.S. Cl.
CPC ............. *G01S 7/417* (2013.01); *G01S 7/411* (2013.01); *G01S 7/415* (2013.01)

(58) Field of Classification Search
None
See application file for complete search history.

(56) References Cited

U.S. PATENT DOCUMENTS

2023/0046274 A1* 2/2023 Chen ..................... G01S 13/931
2024/0019566 A1* 1/2024 Kossaczky .......... G06N 3/0464

* cited by examiner

*Primary Examiner* — Resha Desai
*Assistant Examiner* — Brandon James Henson
(74) *Attorney, Agent, or Firm* — Quinn IP Law

(57) ABSTRACT

A method of performing doppler spectrum encoding for radar object detection. The method includes receiving a radar tensor including a doppler for range and angle combinations. An encoded vector is generated for each of the range and angle combinations. The encoded vector includes a reflection intensity, a frequency of the reflection intensity, and a width of a reflection intensity peak for a predetermined number of greatest reflection intensity peaks for each of the range and angle combinations. An encoded vector dataset is generated from the encoded vectors. Feature extraction is performed on the encoded vector dataset with a feature extraction neural network to generate an extracted feature dataset with extracted feature information for each of the range and angle combinations. Object detection is performed on the extracted feature dataset with an object detection neural network to generate an object detection output for identifying objects.

20 Claims, 3 Drawing Sheets

SYSTEM AND METHOD FOR DOPPLER ENCODING FOR RADAR OBJECT DETECTION

INTRODUCTION

This disclosure relates to a system and method for doppler spectrum encoding of radar for use object detection with object detection neural networks.

Automotive radar is the most promising and fastest-growing civilian application of radar technology. Vehicular radars provide the key enabling technology for the autonomous driving revolution that has the potential to improve everyone's day-to-day lives. Automotive radars, along with other sensors such as lidar, (which stands for "light detection and ranging"), ultrasound, and cameras, form the backbone of self-driving cars and advanced driver assistant systems (ADASs). These technological advancements are enabled by extremely complex systems with a long signal processing path from radars/sensors to the controller. Automotive radar systems are responsible for the detection of objects and obstacles, their position, and speed relative to the vehicle.

SUMMARY

Disclosed herein is a method of performing doppler spectrum encoding for radar object detection. The method includes receiving a radar tensor including a doppler for range and angle combinations. An encoded vector is generated for each of the range and angle combinations from the radar tensor. The encoded vector includes a reflection intensity, a frequency of the reflection intensity, and a width of a reflection intensity peak for a predetermined number of greatest reflection intensity peaks for each of the range and angle combinations. An encoded vector dataset is generated from the encoded vector for each of the range and angle combinations. Feature extraction is performed on the encoded vector dataset with a feature extraction neural network to generate an extracted feature dataset with extracted feature information for each of the range and angle combinations. Object detection is performed on the extracted feature dataset with an object detection neural network to generate an object detection output for identifying objects from the radar tensor.

Another aspect of the disclosure may be where the predetermined number of reflection intensity peaks includes at least three reflection intensity peaks and no more than five reflection intensity peaks.

Another aspect of the disclosure may be where the encoded vector is sorted in descending order by reflection intensity.

Another aspect of the disclosure may be where the predetermined number of greatest reflection intensity peaks is based on an angle of a radar system used to capture the radar tensor.

Another aspect of the disclosure may include generation of a frequency dataset with the frequency of the reflection intensity for each of the predetermined number of greatest reflection intensity peaks for each of the range and angle combinations.

Another aspect of the disclosure may be where the frequency dataset is concatenated onto the extracted feature dataset to generate a concatenated dataset.

Another aspect of the disclosure may be where performing the object detection on the extracted feature dataset includes performing the object detection on the concatenated dataset including both the extracted feature dataset and the frequency dataset.

Another aspect of the disclosure may include utilizing a loss function to determine an accuracy of the object detection neural network by comparing the object detection output to a ground truth dataset for the radar tensor.

Another aspect of the disclosure may include adapting parameters of the object detection neural network based on the loss function to generate an updated object detection neural network.

Another aspect of the disclosure may include adapting parameters of the feature extraction neural network based on the loss function to generate an updated object feature extraction neural network.

Disclosed herein is a non-transitory computer-readable storage medium embodying programmed instructions which, when executed by a processor, are operable for performing a method. The method includes receiving a radar tensor including a doppler for range and angle combinations. An encoded vector is generated for each of the range and angle combinations from the radar tensor. The encoded vector includes a reflection intensity, a frequency of the reflection intensity, and a width of a reflection intensity peak for a predetermined number of greatest reflection intensity peaks for each of the range and angle combinations. An encoded vector dataset is generated from the encoded vector for each of the range and angle combinations. Feature extraction is performed on the encoded vector dataset with a feature extraction neural network to generate an extracted feature dataset with extracted feature information for each of the range and angle combinations. Object detection is performed on the extracted feature dataset with an object detection neural network to generate an object detection output for identifying objects from the radar tensor.

Disclosed herein is a vehicle system. The system includes at least one radar sensor configured to capture information for generating a radar tensor and a controller in communication with the at least one radar sensor. The controller is configured to receive a radar tensor that includes a doppler for range and angle combinations and generate an encoded vector for each of the range and angle combinations from the radar tensor. The encoded vector includes a reflection intensity, a frequency of the reflection intensity, and a width of a reflection intensity peak for a predetermined number of greatest reflection intensity peaks for each of the range and angle combinations. The controller is also configured to generate an encoded vector dataset from the encoded vector for each of the range and angle combinations and perform feature extraction on the encoded vector dataset with a feature extraction neural network. The feature extraction neural network generates an extracted feature dataset with extracted feature information for each of the range and angle combinations. The controller is also configured to perform object detection on the extracted feature dataset with an object detection neural network to generate an object detection output for identifying objects from the radar tensor.

BRIEF DESCRIPTION OF THE DRAWINGS

Some embodiments of the present disclosure are now described, by way of example only, and with reference to the accompanying drawings. The same reference number represents the same element or the same type of element in all drawings.

DETAILED DESCRIPTION

Figure 1:
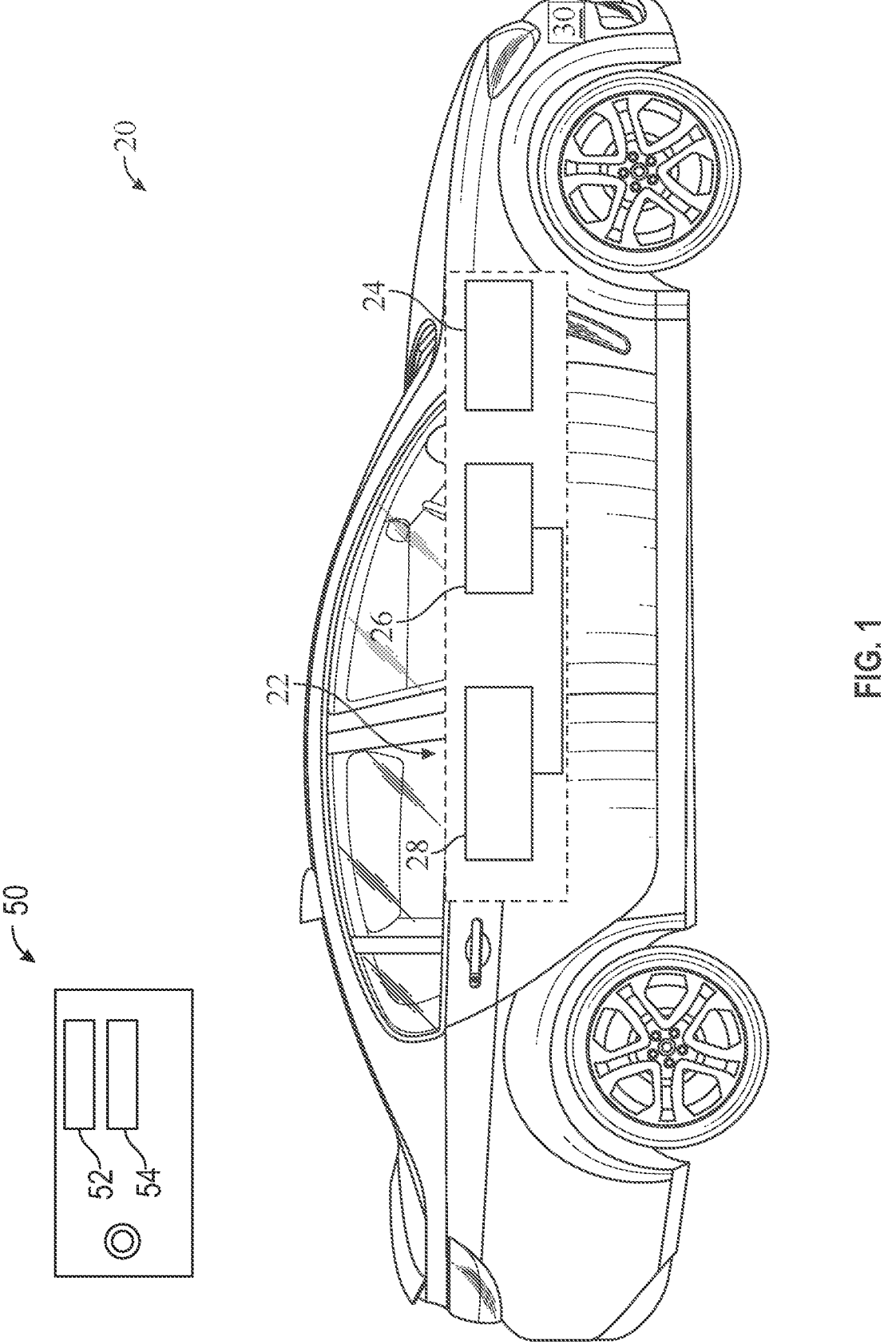
FIG. 1 illustrates an example vehicle and a computer system according to this disclosure.

The present disclosure is susceptible of embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

In accordance with an exemplary embodiment, FIG. 1 shows a vehicle 20 that can be operated in an autonomous mode or automated mode. The vehicle 20 can be a fully autonomous vehicle or a semi-autonomous vehicle. The vehicle 20 includes a driving system 22 that controls autonomous operation of the vehicle 20. The driving system 22 includes a sensor system 24 for obtaining information about the surrounding or environment of the vehicle 20, and a controller 26 for computing possible actions for the autonomous vehicle based on the obtained information and for implementing one or more of the possible actions, and a human machine interface 28 for communicating with an occupant of the vehicle 20, such as a driver or passenger. The sensor system 24 can include at least one depth sensor, such as a radar sensor 30.

The controller 26 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 26 may include a non-transitory computer-readable medium that stores instructions which, when processed by one or more processors of the controller 26, implement a method 100 of encoding a radar doppler spectrum for use in object detection described below.

In one example, the object detection of the method 100 is performed by the controller 26 on the vehicle 20 during an autonomous driving mode. In another example, a remote computer system 50 is used for training at least one of a feature extraction neural network or an object detection neural network as will be described in greater detail below. While the computer system 50 of FIG. 1 is depicted as a unitary computer module for illustrative simplicity, the computer system 50 can be physically embodied as one or more processing nodes having a non-transitory computer-readable storage medium 54, i.e., application-sufficient memory, and associated hardware and software, such as but not limited to a high-speed clock, timer, input/output circuitry, buffer circuitry, and the like. The computer-readable storage medium 54 may include enough read only memory, for instance magnetic or optical memory. Computer-readable code or instructions embodying the methods described below may be executed during operation of the computer system 50. To that end, the computer system 50 may encompass one or more processors 52, e.g., logic circuits, application-specific integrated circuits (ASICs), central processing units, microprocessors, and/or other requisite hardware as needed to provide the programmed functionality described herein.

Figure 2:
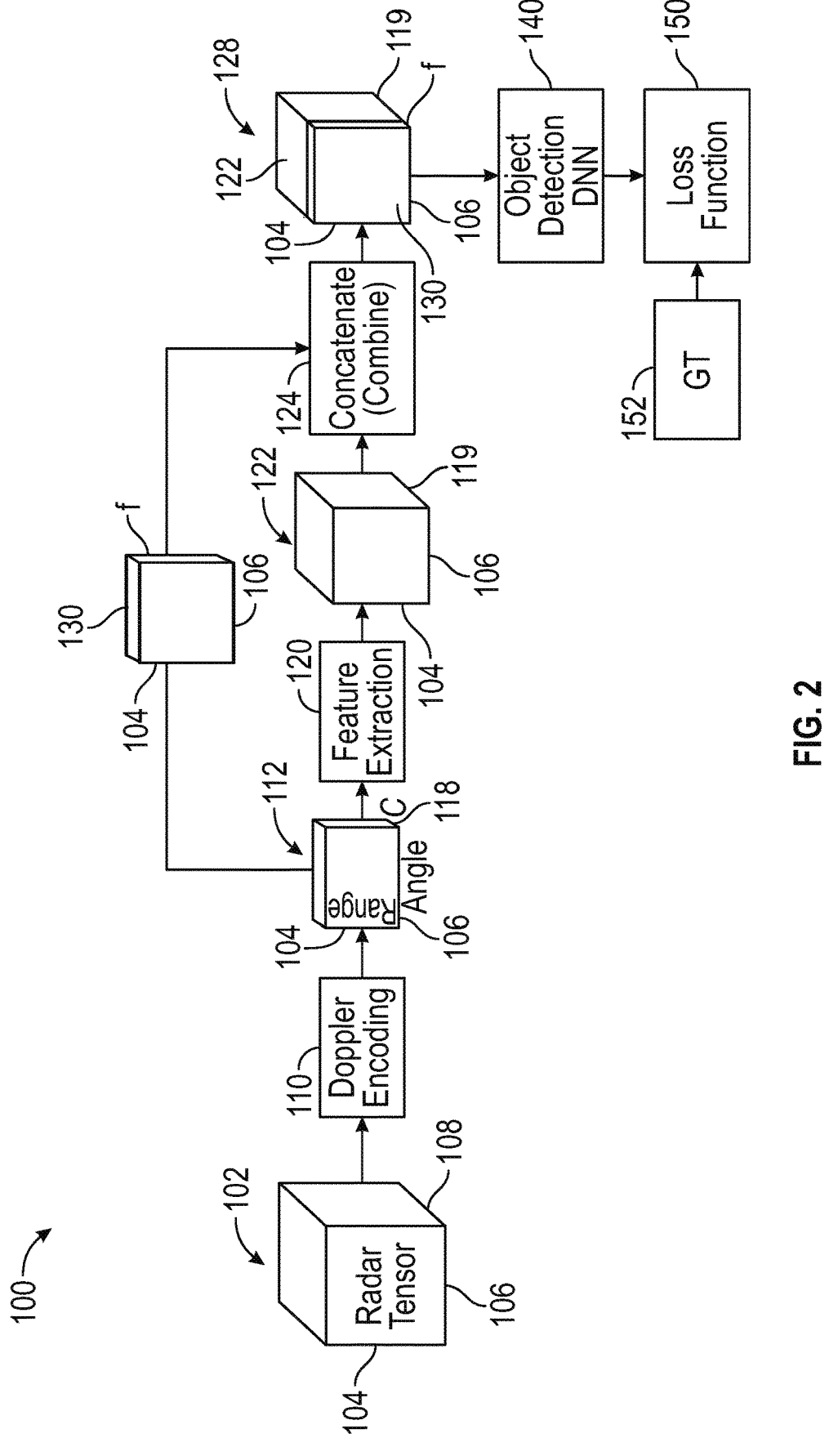
FIG. 2 illustrates a flowchart of an example method of doppler spectrum encoding for radar object detection.

FIG. 2 illustrates a flowchart of the method 100 of performing doppler spectrum encoding for radar object detection. In one example, the method 100 performs object detection utilizing a radar tensor 102 generated by information collected by the radar sensor 30 on the vehicle 20. In the illustrated example, the radar tensor 102 graphically represented a range 104 of the radar sensor 30 along a first dimension, an angle 106 of the radar sensor 30 along a second dimension, and a doppler 108 along a third dimension. While this disclosure describes doppler spectrum encoding used in an automotive application, this disclosure has application in other fields, such as in industrial or security applications.

In the illustrated example, the method 100 begins by receiving a radar tensor 102. The radar tensor 102 can be received live from the radar sensor 30 on the vehicle 20 or be part of a collection of radar tensors 102 used for training purposes. The radar tensor 102 represents a collection of dopplers for a plurality of predetermined ranges 104 and angles 106. The Doppler 108 includes reflection intensity values taken at a plurality of different frequencies. In one example, the reflection intensities can be measured at up to 512 different frequencies.

The radar tensor 102 is received at Block 110 in the method 100 to perform doppler spectrum encoding. One feature of the doppler spectrum encoding is to reduce a size of the information captured in the radar tensor 102. This reduction in size allows the object detection described herein to occur on a controller 26 or computer system 50 with less processing power.

In one example, the doppler spectrum encoding begins by determining a predetermined number of reflection intensity peaks with the greater reflection intensity for each of the plurality combinations of the range 104 and the angle 106 in the radar tensor 102. The number of reflection intensity peaks to identify is based on an expected greatest number of objects that could be expected to be identified for the given range 104 and angle 106. For example, with a smaller range, the method 100 would expect to identify fewer objects while with a larger angle, the method 100 would expect a larger number of possible objects. Therefore, in one example, the number of reflection intensity peaks to identify could range from greater than or equal to three and less than or equal to five. However, fewer than three or greater than five reflection intensity peaks can be identified depending on the resolution of the radar sensor 30.

Figure 3:
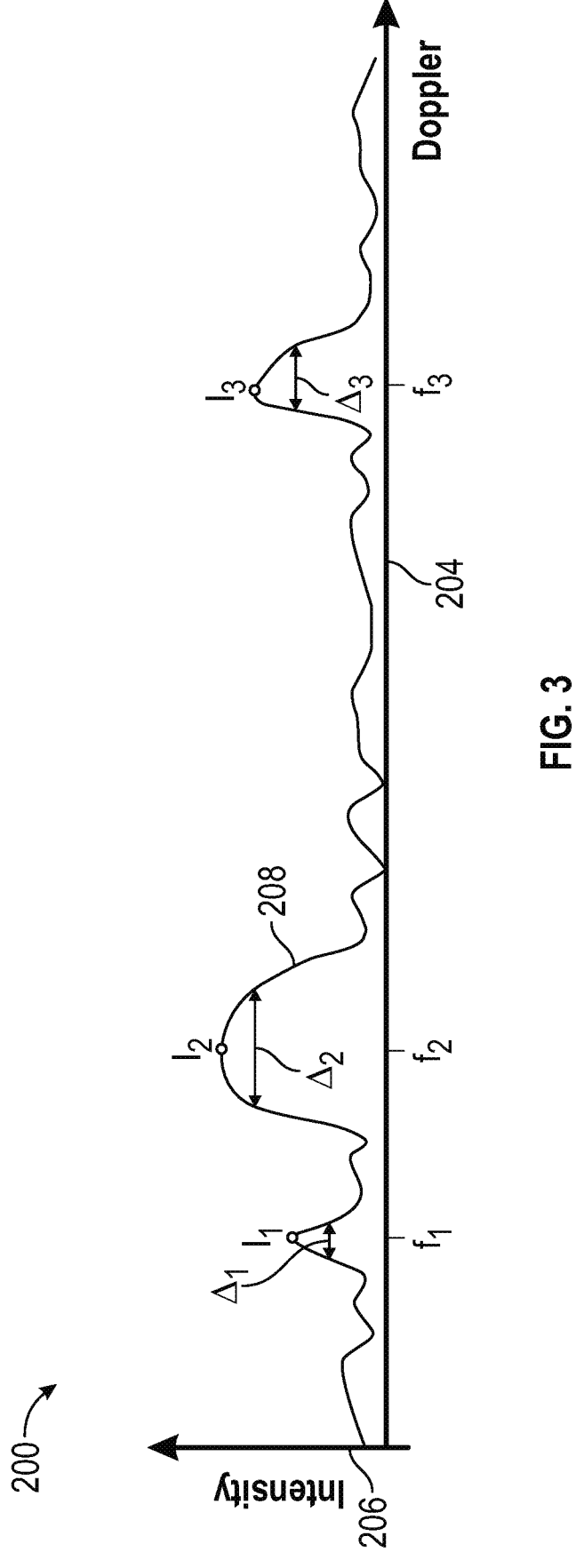
FIG. 3 illustrates an example doppler for a given range and distance.

With the predetermined number of reflection intensity peaks for the given range 104 and angle 106, the method 100 will identify a corresponding number of the largest intensity peaks for each set of the range 104 and angle 106. FIG. 3 is a graphical representation 200 of the doppler 108 for a given range 104 and angle 106. The graphical representation 200 identifies frequencies 204 along an x-axis and reflection intensity 206 along a y-axis. Line 208 represents variations in the reflection intensity as the frequency varies.

Furthermore, the illustrated example of FIG. 3 represents an example where the predetermined number of reflection intensity peaks is equal to 3. For each of the largest reflection intensity peaks identified, the method 100 records a reflection intensity $I_1$, $I_2$, and $I_3$, a frequency $f_1$, $f_2$, and $f_3$ associated with each of reflection intensities $I_1$, $I_2$, and $I_3$, and a width of a reflection intensity peak $\Delta_1$, $\Delta_2$, and $\Delta_3$ corresponding to the three greatest intensities $I_1$, $I_2$, and $I_3$. The above identified values from the Doppler spectrum encoding are stored in a vector c as shown in EQ. 1 below.

$$c = \{(I_2, f_2, \Delta_2), (I_3, f_3, \Delta_3), (I_1, f_1, \Delta_1)\} \qquad \text{EQ. 1}$$

As shown in the example EQ. 1 above, the three corresponding sets of values are sorted in descending order relative to the reflection intensity values $\Delta_1$, $\Delta_2$, and $\Delta_3$. However, the three corresponding sets of values could also be sorted in ascending order relative to the reflection intensity values $\Delta_1$, $\Delta_2$, and $\Delta_3$.

The method 100 then generates an encoded vector dataset 112 representing the encoded vector c for each of the range 104 and angle 106 combinations. The encoded vector dataset 112 includes the range 104 along a first dimension, the angle 106 along a second dimension, and the encoded vectors c 118 along a third dimension. One feature of the encoded vector dataset 112 is a dataset that has been greatly reduced in size. For example, while the range 104 and angle 106 dimensions remain the same, the encoded vector c includes 9 values as opposed to having potentially hundreds of values for each of the range 104 and angle 106 combinations.

With the encoded vector dataset 112, the method 100 performs feature extraction on the encoded vector dataset 112 at Block 120 with a feature extraction neural network. The feature extraction neural network outputs an extracted feature dataset 122. The extracted feature dataset 122 includes the range 104 along a first dimension, the angle 106 along the second dimension, and extracted feature information along a third dimension 119. In the illustrated example, the feature extraction can include identification of specific features from the encoded vector dataset 112, such as identifying lines or other shapes.

At Block 124, the extracted feature dataset 122 can optionally be concatenated with a frequency dataset 130. In the illustrated example, the frequency dataset 130 is generated by the method 100 from the encoded vector dataset 112. The frequency dataset 130 includes the frequencies $f_1$, $f_2$, and $f_3$ associated with each of the corresponding reflection intensities $I_1$, $I_2$, and $I_3$. When the frequency dataset 130 is combined with the extracted feature dataset 122, a concatenated dataset 128 is generated by combining the frequency dataset 130 onto the extracted feature dataset 122. One feature of the concatenated dataset 128 is that it combines the frequencies $f_1$, $f_2$, and $f_3$ with the extracted features for each of the combinations of the range 104 and the angle 106.

With the concatenated dataset 128 the method 100 proceeds to Block 140 to perform object detection with an object detection neural network. In one example, the object detection neural network at Block 140 has the option of utilizing just the information from the extracted feature dataset 122 or utilizing the information from the frequency dataset 130 in connection with the extracted feature dataset 122. One feature of utilizing the entire concatenated dataset 128 with the object detection neural network at Block 140 is to associate specific frequencies with the extracted features in the extracted feature dataset 122. The object detection neural network at Block 140 can then provide an output identifying objects from the original radar tensor 102.

The object detection performed by the method 100 through Block 140 can occur on either the controller 26 or the remote computer system 50. This allows the controller 26 to perform object detection in real time. However, for purposes utilizing the method 100 for training at least one of the feature extraction neural network from Block 120 or the object detection neural network from Block 140, the remote computer system 50 may be utilized instead of the controller 26. One feature of utilizing the remote computer system 50 for training purposes is that it reduces the computational power needed by the controller 26.

For the purposes of training, the output of the object detection neural network is fed into a loss function at Block 150. At Block 150, the method 100 compares the output of the object detection neural network with a ground truth dataset of the radar tensor 102 from Block 152.

The comparison leads to an adaptation of the parameters used in at least one of the feature extraction neural network or the object detection neural network. The adaption of the parameters is used to generate an updated feature extraction neural network and an update object detection neural network that can be used in subsequent training runs of the method 100 or for object detection with the method 100. The method 100 can be run multiple times with the same radar tensor 102 to extract the greatest learning potential from the radar tensor for adapting the parameters.

Furthermore, when the method 100 is used for training the feature extraction neural network and the object detection neural network, a large dataset of radar tensors 102 with their associated ground truth dataset can be used for further parameter adaptation of at least one of the feature extraction neural network or the object detection neural network. Furthermore, each of these additional radar tensors 102 used for training purposes can be run multiple times to extract the greatest learning from each of the radar tensors 102 and the associated ground truth datasets.

The method 100 can proceed for training purposes with additional radar tensors 102 and ground truth dataset until the loss function determines that the accuracy of the output of the object detection neural network from Block 140 is within a predetermined accuracy of the ground truth dataset. At this point, the supervised training of the feature extraction neural network and the object detection neural network are completed. The method 100 can be run on the controller 26 of the vehicle 20 to perform object detection in real time to assist with autonomously navigating the vehicle 20.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of performing doppler spectrum encoding for radar object detection, the method comprising:

receiving a radar tensor, wherein the radar tensor includes a doppler for a plurality of range and angle combinations;

generating an encoded vector for each of the plurality of range and angle combinations from the radar tensor, wherein the encoded vector includes a reflection intensity, a frequency of the reflection intensity, and a width of a reflection intensity peak for a predetermined number of greatest reflection intensity peaks for each of the plurality of range and angle combinations;

generating an encoded vector dataset from the encoded vector for each of the plurality of range and angle combinations;

performing feature extraction on the encoded vector dataset with a feature extraction neural network to generate an extracted feature dataset with extracted feature information for each of the plurality of range and angle combinations; and performing object detection on the extracted feature dataset with an object detection neural network to generate an object detection output for identifying objects from the radar tensor.

2. The method of claim 1, wherein the predetermined number of reflection intensity peaks includes at least three reflection intensity peaks and no more than five reflection intensity peaks.

3. The method of claim 1, wherein the predetermined number of reflection intensity peaks includes at least three reflection intensity peaks and no more than five reflection intensity peaks and the encoded vector is sorted in descending order by reflection intensity.

4. The method of claim 1, wherein the predetermined number of greatest reflection intensity peaks is based on an angle of a radar system used to capture the radar tensor.

5. The method of claim 1, including generating a frequency dataset with the frequency of the reflection intensity for each of the predetermined number of greatest reflection intensity peaks for each of the plurality of range and angle combinations.

6. The method of claim 5, wherein the frequency dataset is concatenated onto the extracted feature dataset to generate a concatenated dataset.

7. The method of claim 6, wherein performing the object detection on the extracted feature dataset includes performing the object detection on the concatenated dataset including both the extracted feature dataset and the frequency dataset.

8. The method of claim 1, including utilizing a loss function to determine an accuracy of the object detection neural network by comparing the object detection output to a ground truth dataset for the radar tensor.

9. The method of claim 8, including adapting parameters of the object detection neural network based on the loss function to generate an updated object detection neural network.

10. The method of claim 8, including adapting parameters of the feature extraction neural network based on the loss function to generate an updated object feature extraction neural network.

11. The method of claim 3, including generating a frequency dataset with a first dimension including range of the radar tensor, a second dimension including angle of the radar tensor, and a third dimension including the frequency of the reflection intensity for each of the predetermined number of greatest reflection intensity peaks for each of the plurality of range and angle combinations, wherein the frequency dataset is concatenated onto the extracted feature dataset to generate a concatenated dataset, and performing the object detection on the extracted feature dataset includes performing the object detection on the concatenated dataset including both the extracted feature dataset and the frequency dataset.

12. A non-transitory computer-readable storage medium embodying programmed instructions which, when executed by a processor, are operable for performing a method comprising:

receiving a radar tensor, wherein the radar tensor includes a doppler for a plurality of range and angle combinations;

generating an encoded vector for each of the plurality of range and angle combinations from the radar tensor, wherein the encoded vector includes a reflection intensity, a frequency of the reflection intensity, and a width of a reflection intensity peak for a predetermined number of greatest reflection intensity peaks for each of the plurality of range and angle combinations;

generating an encoded vector dataset from the encoded vector for each of the plurality of range and angle combinations;

performing feature extraction on the encoded vector dataset with a feature extraction neural network to generate an extracted feature dataset with extracted feature information for each of the plurality of range and angle combinations; and performing object detection on the extracted feature dataset with an object detection neural network to generate an object detection output for identifying objects from the radar tensor.

13. The computer-readable storage medium of claim 12, wherein the predetermined number of reflection intensity peaks includes at least three reflection intensity peaks and no more than five reflection intensity peaks and the extracted feature dataset includes a first dimension with a range of the radar tensor, a second dimension with an angle of the radar tensor, and a third dimension with the extracted feature information for the plurality of range and angle combinations.

14. The computer-readable storage medium of claim 13, including generating a frequency dataset with the frequency of the reflection intensity for each of the predetermined number of greatest reflection intensity peaks for each of the plurality of range and angle combinations, wherein the frequency dataset is concatenated onto the extracted feature dataset to generate a concatenated dataset.

15. The computer-readable storage medium of claim 14, wherein performing the object detection on the extracted feature dataset includes performing the object detection on the concatenated dataset including both the extracted feature dataset and the frequency dataset.

16. The computer-readable storage medium of claim 12, including utilizing a loss function to determine an accuracy of the object detection neural network by comparing the object detection output to a ground truth dataset for the radar tensor.

17. The computer-readable storage medium of claim 16, including adapting parameters of the object detection neural network based on the loss function to generate an updated object detection neural network.

18. The computer-readable storage medium of claim 16, including adapting parameters of the feature extraction neural network based on the loss function to generate an updated object feature extraction neural network.

19. A vehicle system comprising:

at least one radar sensor configured to capture information for generating a radar tensor;

a controller in communication with the at least one radar sensor, wherein the controller is configured to:

receive a radar tensor, wherein the radar tensor includes a doppler for a plurality of range and angle combinations;

generate an encoded vector for each of the plurality of range and angle combinations from the radar tensor, wherein the encoded vector includes a reflection intensity, a frequency of the reflection intensity, and a width of a reflection intensity peak for a predetermined number of greatest reflection intensity peaks for each of the plurality of range and angle combinations;

generate an encoded vector dataset from the encoded vector for each of the plurality of range and angle combinations;

perform feature extraction on the encoded vector dataset with a feature extraction neural network to generate an extracted feature dataset with extracted feature information for each of the plurality of range and angle combinations; and perform object detection on the extracted feature dataset with an object detection neural network to generate an object detection output for identifying objects from the radar tensor.

20. The vehicle system of claim 19, wherein the predetermined number of reflection intensity peaks includes at least three reflection intensity peaks and no more than five reflection intensity peaks and the extracted feature dataset includes a first dimension with a range of the radar tensor, a second dimension with an angle of the radar tensor, and a third dimension with the extracted feature information for the plurality of range and angle combinations.

* * * * *